Figure 1:
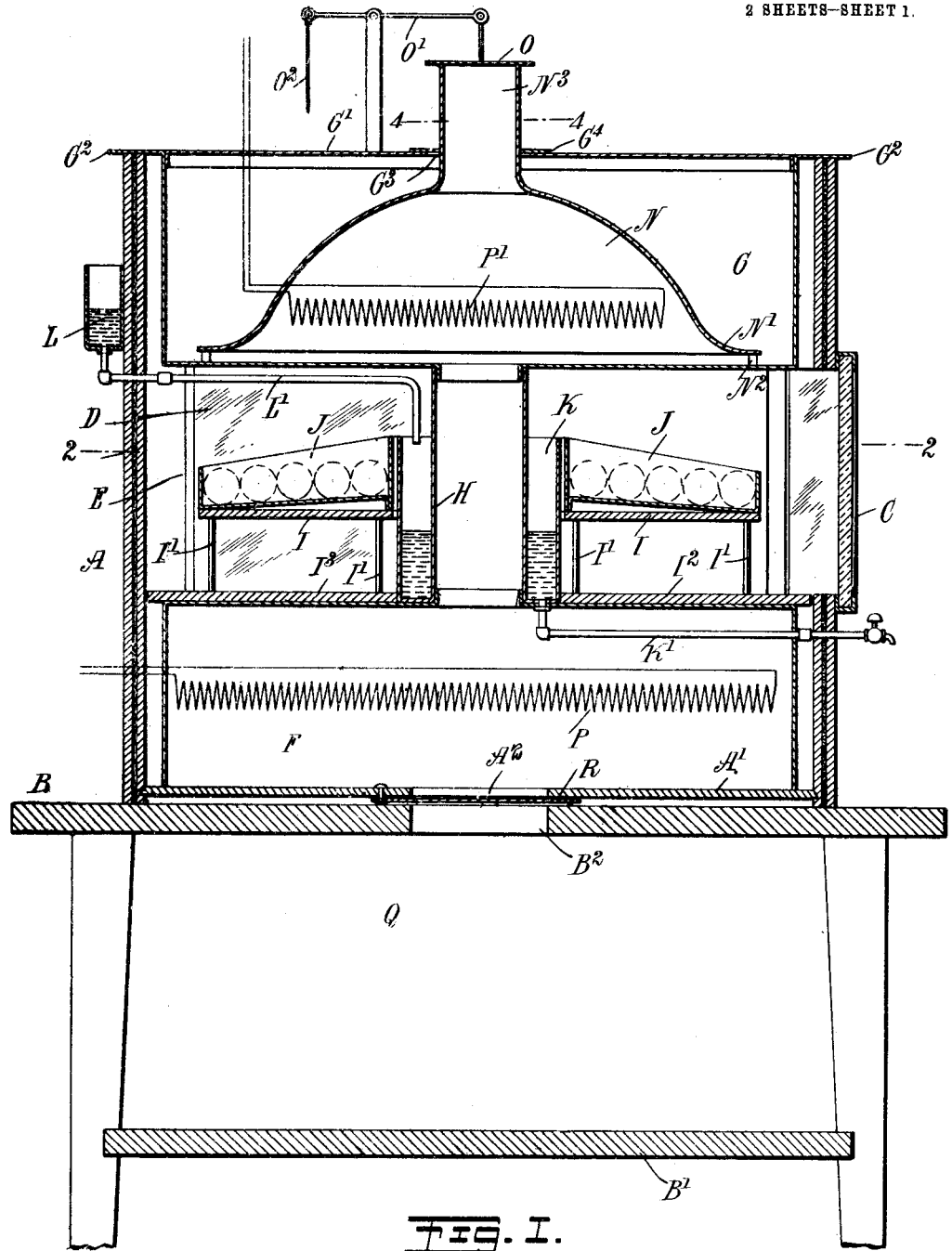

C. J. DITTBRENNER.
INCUBATOR.
APPLICATION FILED SEPT. 28, 1911.

1,033,555.

Patented July 23, 1912.
2 SHEETS—SHEET 1.

WITNESSES

INVENTOR
Charles J. Dittbrenner
BY
ATTORNEYS

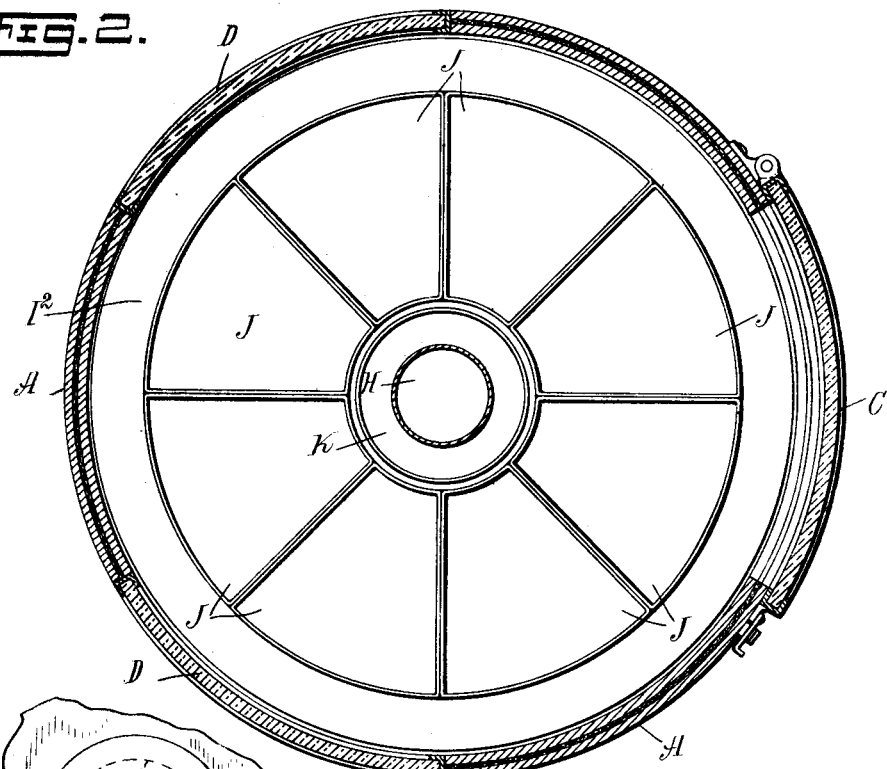
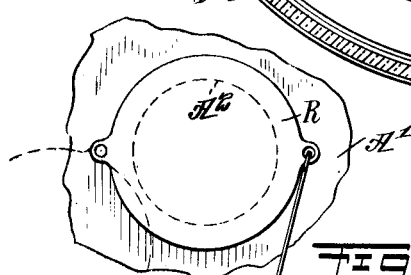
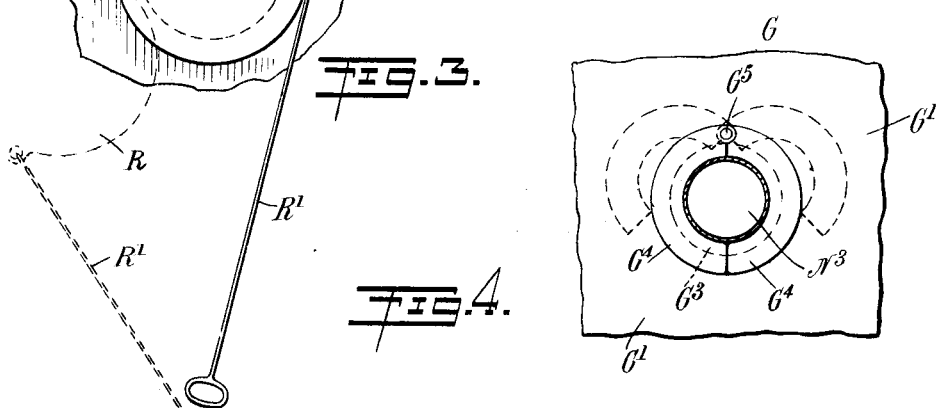

UNITED STATES PATENT OFFICE.

CHARLES JULGUS DITTBRENNER, OF CORNWALL, NEW YORK.

INCUBATOR.

1,033,555.  Specification of Letters Patent.  Patented July 23, 1912.

Application filed September 28, 1911. Serial No. 651,796.

*To all whom it may concern:*

Be it known that I, CHARLES J. DITTBRENNER, a subject of the German Emperor, and a resident of Cornwall, in the county of Orange and State of New York, have invented a new and Improved Incubator, of which the following is a full, clear, and exact description.

The object of the invention is to provide a new and improved incubator, which is simple and durable in construction, composed of comparatively few parts which can be readily assembled and disassembled, and arranged to insure a uniform heating of the eggs in the hatching compartment, to provide a proper circulation of air, to moisten the air, and to furnish a suitable running space or nursery for the hatched chicks.

In order to accomplish the desired result use is made of a lower heating chamber provided on top with a connecting flue leading to an upper heating chamber, the said heating chambers being spaced apart to form between them a hatching compartment having a tray support and a nursery, and a water receptacle surrounding the said flue within the said hatching compartment.

A practical embodiment of the invention is represented in the accompanying drawings forming a part of this specification, in which similar characters of reference indicate corresponding parts in all the views.

Figure 1 is a vertical central section of the incubator; Fig. 2 is a sectional plan view of the same on the line 2—2 of Fig. 1; Fig. 3 is a plan view of part of the bottom cover of the casing; and Fig. 4 is a sectional plan view of the heat escape valve on the top of the upper heating chamber.

The casing or shell A of the incubator is preferably set on a table, bench or other support B, and the said casing is preferably made circular and provided in its side wall with a glass door C and glass windows D at the hatching compartment E, below which is arranged a heating chamber F and above which is located a heating chamber G. The lower and upper heating chambers F and G are connected with each other by a connecting flue H extending centrally from the top of the lower heating chamber F to the bottom of the upper heating chamber G so as to support the upper heating chamber G from the lower heating chamber F, which latter is formed of a metallic top and an integral side set with its lower end on the bottom A' of the casing A. The top G' of the upper heating chamber G is provided with an outwardly-extending annular flange $G^2$ resting on the upper edge of the casing A thus closing the open top of the said casing.

Within the hatching compartment E is arranged an annular tray support I held on posts or pins I' attached to or resting on the wooden bottom $I^2$ resting on top of the lower heating chamber F. The support I is adapted to support a series of egg trays J, containing the eggs to be hatched, and preferably provided with outwardly and downwardly inclined bottoms, as plainly indicated in Fig. 1. By the use of the door C convenient access is had to the hatching compartment E so as to permit of manipulating the eggs in the trays J, and to shift the latter around, for filling or emptying the same, as the case may be. By arranging the supports I' a distance above the bottom $I^2$ a nursery is provided for the chicks hatched from the eggs in the trays J and jumping from the trays onto the bottom $I^2$.

The connecting flue H is surrounded by a water receptacle K forming, preferably, part of the flue H and opening into the hatching compartment E at the upper inner ends of the trays J, so that the water in evaporating supplies the air in the compartment E with the necessary moisture. The water receptacle K is adapted to be filled with water from the outside by way of a suitable tank L attached to the outside of the casing A, and connected by a pipe L' with the receptacle K. The receptacle K can be drained by a suitable valved drain pipe K' leading to the outside of the casing A, as shown in Fig. 1.

Within the upper heating chamber G is arranged a dome N provided at its open base N' with posts $N^2$ for supporting the dome from the bottom of the upper heating chamber G and for spacing the base N' from the said bottom to allow the heat to pass from under the dome into the upper heating chamber G. The top of the dome N is provided with an outlet flue $N^3$ extending through an opening $G^3$ in the top G' of the upper heating chamber G, and the said opening $G^3$ is somewhat larger in diameter than the outlet flue $N^3$, and the said opening $G^3$ is controlled by a valve $G^4$, preferably made in sections, pivoted at $G^5$ to the top G' of the upper heating chamber G, so that the operator can swing the valve G⁴ into closed, partly open or wholly open position to allow escape of the heat from the upper heating chamber G by way of the opening G³.

The upper end of the outlet flue N³ is adapted to be opened and closed by a cover O hung on a lever O' connected by a cord, link or other means O² with a thermostat or other contrivance for opening and closing the cover O according to the heat within the hatching chamber E.

The lower and upper heating chambers F and G are adapted to be heated by electrical heaters P, P', of any approved construction, the upper heater P' being perferably arranged within the dome N. If desired, use may be made of a lamp instead of the electrical heaters P and P', the lamp resting on a shelf B' of the support B, and having its chimney extending through an opening B² in the support B and through an opening A² in the bottom A' of the casing A, the upper end of the chimney opening into the central or connecting flue H. The opening A² in the bottom A' of the casing A is closed by a cover R as long as the electrical heaters P and P' are used, but when it is desired to use the lamp for heating purposes then the cover R is swung open, and for this purpose the free end of the cover is connected with a suitable handle R' extending to the outside of the casing A to permit the operator to swing the cover R into open or closed position, as will be readily understood by reference to Figs. 1 and 3.

It will be noticed that by the arrangement described the hatching compartment E and nursery is located between the heating chambers F and G, to insure a uniform temperature in the said hatching compartment and nursery so that the eggs are properly hatched and the chicks are protected against cold, and sufficient light is furnished by way of the glass door C and windows D. By the use of the dome N the heat is confined in the heating chamber G on top of the hatching compartment E. The water receptacle K surrounds the connecting flue H so that the water is in direct contact with the heated flue and consequently the water readily vaporizes to supply the air in the hatching compartment and nursery with the necessary moisture conducive to the hatching of the eggs and the welfare of the chicks. On opening the door R more or less fresh air can be readily admitted to the heating compartment F by way of the openings B² and A².

It will be noticed that the several parts within the casing A can be readily assembled and disassembled as the main parts are practically but three in number, that is, the lower heating chamber F, connecting tube H and water receptacle K are rigidly connected with each other to form one part; the upper heating chamber G, dome N and regulating cover O form another part; and the bottom I², posts I' and tray support I form the third part; and the three parts can be readily placed in position, one on top of the other, through the upper open end of the casing, or removed therefrom in reverse order for cleaning or other purposes. The pipes L' and K' are made in telescoping sections to permit of assembling the sections or removing the same.

The egg trays can be readily placed in position, shifted around or removed by way of the door C.

Having thus described my invention, I claim as new and desire to secure by Letters Patent:

1. An incubator, comprising a casing, a lower heating chamber in the lower portion of the casing and provided on top with a central upwardly-extending flue, an upper heating chamber supported on the said flue in the upper portion of the casing, the said heating chambers being spaced apart to form in the casing a hatching compartment having a bottom resting on the top of the said lower heating chamber, a tray support above the said bottom and around the flue, posts for supporting the tray support to form a nursery below the tray support, and an annular water receptacle surrounding the said flue within the said hatching compartment and between said flue and said tray support.

2. An incubator, comprising a casing, a lower heating chamber in the lower portion of the casing and provided on top with a central upwardly-extending flue, an upper heating chamber supported on the said flue in the upper portion of the casing, the said heating chambers being spaced apart to form in the casing a hatching compartment having a bottom resting on the top of the said lower heating chamber, a tray support above the said bottom and around the flue, posts for supporting the tray support to form a nursery below the tray support, an annular water receptacle surrounding the said flue within the said hatching compartment, a tank on the outside of the casing, and a pipe connecting the said tank with the said water receptacle to fill the latter from the outside.

3. An incubator, comprising a casing, a lower heating chamber in the lower portion of the casing and provided on top with a central upwardly-extending flue, an upper heating chamber supported on the said flue in the upper portion of the casing, the said heating chambers being spaced apart to form in the casing a hatching compartment having a bottom resting on the top of the said lower heating chamber, a tray support above the said bottom, posts for supporting the tray support to form a nursery below the tray support, and an annular water receptacle surrounding the said flue within the said hatching compartment and terminating some distance below the upper heating chamber, the said water receptacle, flue and lower heating chamber being rigidly connected with each other.

4. An incubator, comprising a casing having a bottom and an open top, a lower heating chamber in the lower portion of the said casing and formed by a top and integral side resting on the said casing bottom, a connecting flue attached to the said top of the lower heating chamber and extending upwardly, an upper heating chamber having its bottom supported on the said flue and provided on its top with an outwardly-extending flange resting on top of the said casing to close the upper end thereof, the said heating chambers being spaced apart to form a hatching compartment between the chambers, and a dome within the said upper heating chamber and having its open bottom spaced from the bottom of the said upper heating chamber, the dome being provided at the top with an outlet flue extending through the top of the upper heating chamber.

5. An incubator, comprising a casing having a bottom and an open top, a lower heating chamber in the lower portion of the said casing and formed by a top and integral side resting on the said casing bottom, a connecting flue attached to the said top of the lower heating chamber and extending upwardly, an upper heating chamber having its bottom supported on the said flue and provided on its top with an outwardly-extending flange resting on top of the said casing to close the upper end thereof, the said heating chambers being spaced apart to form a hatching compartment between the chambers, a dome within the said upper heating chamber and having its open bottom spaced from the bottom of the said upper heating chamber, the dome being provided at the top with an outlet flue extending through the top of the upper heating chamber, the opening in the top of the upper heating chamber and through which passes the said outlet flue being larger than the said outlet flue, and a valve for controlling the said opening outside of the outlet flue.

6. An incubator provided with a hatching compartment, heating chambers above and below the said compartment, a dome within the said upper heating chamber and having its open base spaced from the bottom of the said upper heating chamber, the said dome having an outlet flue extending through the top of the said upper heating chamber, a connecting flue between the said heating chambers and opening at its upper end into the dome, an annular water receptacle surrounding the said connecting flue within the said hatching compartment, and an annular tray support extending around the said water receptacle within the said hatching compartment and supported above the bottom thereof to form a nursery below the said tray support.

7. An incubator provided with a hatching compartment, heating chambers above and below said compartment, said upper heating chamber having an opening in its top, a dome within the said heating chamber having an open base secured in spaced relation to the base of said heating chamber and provided with an upper outlet flue extending through the said opening in the chamber top, a connecting flue between the said heating chambers and opening at its upper end into the said dome, a damper for closing the upper end of the said dome outlet flue, and a damper extending around the said dome outlet flue for closing the opening in the top of the upper chamber.

8. An incubator comprising a casing, a lower heating chamber in said casing having a central opening in its top and an upstanding circular flange surrounding said opening, an upper heating chamber spaced above said lower chamber and having a central opening in its base, and a depending circular flange surrounding said opening, both said opening and said flange being in vertical alinement with those of the lower chamber, a pair of concentric cylinders integrally united at their base whereby to form a water chamber, the inner of said cylinders being of a length substantially equal to the space between the upper and lower heating chambers, and being disposed to surround e flange openings of said chambers whereby to constitute a connecting flue, the space between said heating chambers constituting a hatching compartment, a supporting tray within said hatching compartment and surrounding said concentric cylinders, and elevated above the top of the lower heating chamber whereby to form a nursery between the tray and the lower heating chamber, means for heating the said chambers, and means within the upper heating chambers for confining the heat within the lower portion of the said upper chamber.

In testimony whereof I have signed my name to this specification in the presence of two subscribing witnesses.

CHARLES JULGUS DITTBRENNER.

Witnesses:
WILLIAM BROPHY,
JOHN JOSEPH HENEHER.